United States Patent
Ban

(10) Patent No.: US 8,194,659 B2
(45) Date of Patent: *Jun. 5, 2012

(54) MECHANISM FOR PROCESSING MESSAGES USING LOGICAL ADDRESSES

(75) Inventor: Bela Ban, Kreuzlingen (CH)

(73) Assignee: Red Hat, Inc., Raleigh, NC (US)

( * ) Notice: Subject to any disclaimer, the term of this patent is extended or adjusted under 35 U.S.C. 154(b) by 147 days.

This patent is subject to a terminal disclaimer.

(21) Appl. No.: 12/574,662

(22) Filed: Oct. 6, 2009

(65) Prior Publication Data

US 2011/0080921 A1    Apr. 7, 2011

(51) Int. Cl.
*H04L 12/28* (2006.01)
(52) U.S. Cl. .................. 370/389; 370/469; 709/226
(58) Field of Classification Search .................. 370/341, 370/389, 395.2–395.31, 431, 469; 709/200, 709/204–207, 226–228, 230, 238
See application file for complete search history.

(56) References Cited

U.S. PATENT DOCUMENTS

| | | | |
|---|---|---|---|
| 7,830,876 B2 * | 11/2010 | Ban | 370/389 |
| 2007/0244966 A1 * | 10/2007 | Stoyanov et al. | 709/204 |
| 2009/0055623 A1 * | 2/2009 | Hepkin et al. | 711/203 |

OTHER PUBLICATIONS

Bela Ban, Jboss, A Memcached Implementation in JGroups, Sep. 2008, 11 pages, Memchached article: http://igroups.org/javagroupsnew/docs/memcached.html.

* cited by examiner

*Primary Examiner* — Ricky Ngo
*Assistant Examiner* — Kan Yuen
(74) *Attorney, Agent, or Firm* — Lowenstein Sandler PC

(57) ABSTRACT

A method and apparatus for processing message includes forming a logical address upon a creation of a channel of a group communication protocol at a logical address generator of a server. The logical address includes a unique identifier (UUID) associated with a logical name. The UUID created upon connecting the channel, and deleted upon disconnecting the channel. A mapping between UUIDs and physical addresses of members of the group is stored in a cache of a member of the group.

17 Claims, 7 Drawing Sheets

MECHANISM FOR PROCESSING MESSAGES USING LOGICAL ADDRESSES

TECHNICAL FIELD

Embodiments of the present invention relate to group communication, and more specifically to processing of messages.

BACKGROUND

Group communication protocol designed for multicast communication may be used to communicate messages between endpoints forming a group. Communication endpoints can be processes or objects, or any entity that can send and receive messages to/from a group.

The destination address of a node may comprise an Internet Protocol (IP) address and port of a receiver socket. However, the use of such IP address provides some disadvantages. For example, when a node is shunned and later rejoins, its physical address may have changed. A communication directed to a Network Interface Controller (NIC) may be interrupted if the NIC fails. Also, the sender's address may be changed by a Netword Address Translator (NAT).

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for processing message that includes forming a logical address upon a creation of a channel of a group communication protocol at a logical address generator of a server. The logical address includes a unique identifier (UUID) associated with a logical name. The UUID is created upon connecting the channel, and deleted upon disconnecting the channel. A mapping between UUIDs and physical addresses of members of the group is stored in a cache of a member of the group.

Group Communication Architecture

Figure 1:
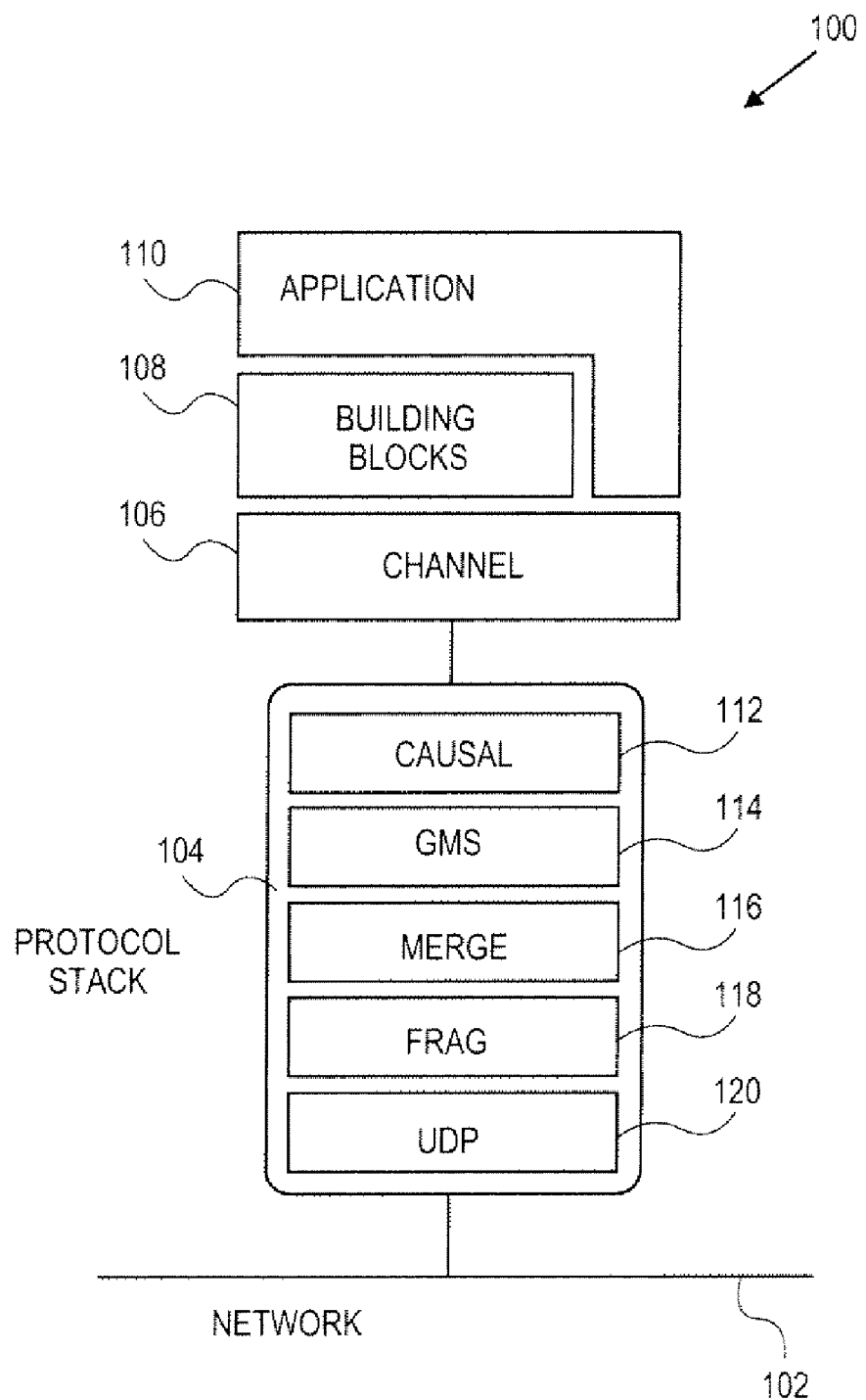
FIG. 1 illustrates a network architecture of a group communication in which embodiments of the present invention may be implemented.

FIG. 1 illustrates an exemplary network architecture of a group communication 100. In one embodiment, the group communication uses a multicast communication tool called JGroups.

JGroups is toolkit for reliable group communication. Processes can join a group, send messages to all members or single members and receive messages from members in the group. The system keeps track of the members in every group, and notifies group members when a new member joins, or an existing member leaves or crashes. A group is identified by its name. Groups do not have to be created explicitly; when a process joins a non-existing group, that group will be created automatically. Member processes of a group can be located on the same host, within the same LAN, or across a WAN. A member can be part of multiple groups.

The group communication architecture may include three parts: (1) a channel Application Programming Interlace (API) 106 used by application programmers to build reliable group communication applications, (2) building blocks 108, which are layered on top of channel 106 and provide a higher abstraction level and (3) a protocol stack 104, which implements the properties specified for a given channel.

Channel 106 is connected to protocol stack 104. Whenever an application sends a message, channel 106 passes it on to protocol stack 104 including several protocols 112, 114, 116, 118, 120. The top most protocol processes the message and passes it on to the protocol below it. Thus, the message is handed from protocol to protocol until the bottom protocol puts it on the network 102. The same happens in the reverse direction: the bottom (transport) protocol listens for messages on network 102. When a message is received, it will be handed up protocol stack 104 until it reaches channel 106. Channel 106 stores the message in a queue until application 110 consumes it.

When application 110 connects to channel 106, protocol stack 104 will be started, and when it disconnects protocol stack 104 will be stopped. When channel 106 is closed, protocol stack 104 will be destroyed, releasing its resources.
Channel To join a group and send messages, a process has to create a channel and connect to it using the group name (all channels with the same name form a group). The channel is the handle to the group. While connected, a member may send and receive messages to/from all other group members. The client leaves a group by disconnecting from the channel. A channel can be reused: clients can connect to it again after having disconnected. However, a channel may allow only one client to be connected at a time. If multiple groups are to be joined, multiple channels can be created and connected to. A client signals that it no longer wants to use a channel by closing it. After this operation, the channel may not be used any longer.

Each channel has a unique address. Channels always know who the other members are in the same group: a list of member addresses can be retrieved from any channel. This list is called a view. A process can select an address from this list and send a unicast message to it (also to itself), or it may send a multicast message to all members of the current view. Whenever a process joins or leaves a group, or when a crashed process has been detected, a new view is sent to all remaining group members. When a member process is suspected of having crashed, a suspicion message is received by all non-faulty members. Thus, channels receive regular messages, view messages and suspicion messages. A client may choose to turn reception of views and suspicions on/off on a channel basis.

Channels may be similar to UNIX sockets: messages are stored in a channel until a client removes the next one (pull-principle). When no message is currently available, a client is blocked until the next available message has been received.

A channel may be implemented over a number of alternatives for group transport. Therefore, a channel is an abstract class, and concrete implementations are derived from it, e.g. a channel implementation using its own protocol stack, or others using existing group transports such as JChannel and EnsChannel. Applications only deal with the abstract channel class, and the actual implementation can be chosen at startup time.

The properties for a channel may be specified in a colon-delimited string format. When creating a channel (JChannel) a protocol stack will be created according to these properties. All messages will pass through this stack, ensuring the quality of service specified by the properties string for a given channel.

Building Blocks

Channels are simple and primitive. They offer the bare functionality of group communication, and have on purpose been designed after the simple model of Unix sockets, which are widely used and well understood. The reason is that an application can make use of just this small subset of JGroups, without having to include a whole set of sophisticated classes, that it may not even need. Also, a somewhat minimalistic interface is simple to understand: a client needs to know about 12 methods to be able to create and use a channel (and oftentimes will only use 3-4 methods frequently).

Channels provide asynchronous message sending/reception, somewhat similar to UDP. A message sent is essentially put on the network and the send( ) method will return immediately. Conceptual requests, or responses to previous requests, are received in undefined order, and the application has to take care of matching responses with requests.

Also, an application has to actively retrieve messages from a channel (pull-style); it is not notified when a message has been received. Note that pull-style message reception often needs another thread of execution, or some form of event-loop, in which a channel is periodically polled for messages.

JGroups offers building blocks that provide more sophisticated APIs on top of a Channel. Building blocks either create and use channels internally, or require an existing channel to be specified when creating a building block. Applications communicate directly with the building block, rather than the channel. Building blocks are intended to save the application programmer from having to write tedious and recurring code, e.g. request-response correlation.

Protocol Stack

As discussed above, JGroups provides two channel implementations: an Ensemble-based channel and its own channel based on a Java protocol stack. The latter is a protocol stack containing a number of protocol layers in a bidirectional list. FIG. 1 illustrates protocol stack 104 with the following protocols: CAUSAL 112, GMS 114, MERGE 116, FRAG 118, UDP 120.

All messages sent and received over the channel have to pass through the protocol stack 104. Every layer may modify, reorder, pass or drop a message, or add a header to a message. A fragmentation layer might break up a message into several smaller messages, adding a header with an id to each fragment, and re-assemble the fragments on the receiver's side.

The composition of the protocol stack, i.e. its layers, is determined by the creator of the channel: a property string defines the layers to be used (and the parameters for each layer). This string might be interpreted differently by each channel implementation; in JChannel it is used to create the stack, depending on the protocol names given in the property.

Knowledge about the protocol stack is not necessary when only using channels in an application. However, when an application wishes to ignore the default properties for a protocol stack, and configure their own stack, then knowledge about what the individual layers are supposed to do is needed. Although it is possible to stack any layer on top of each other (they all have the same interface), this does not make sense semantically in most cases.

Channel States

Figure 2:
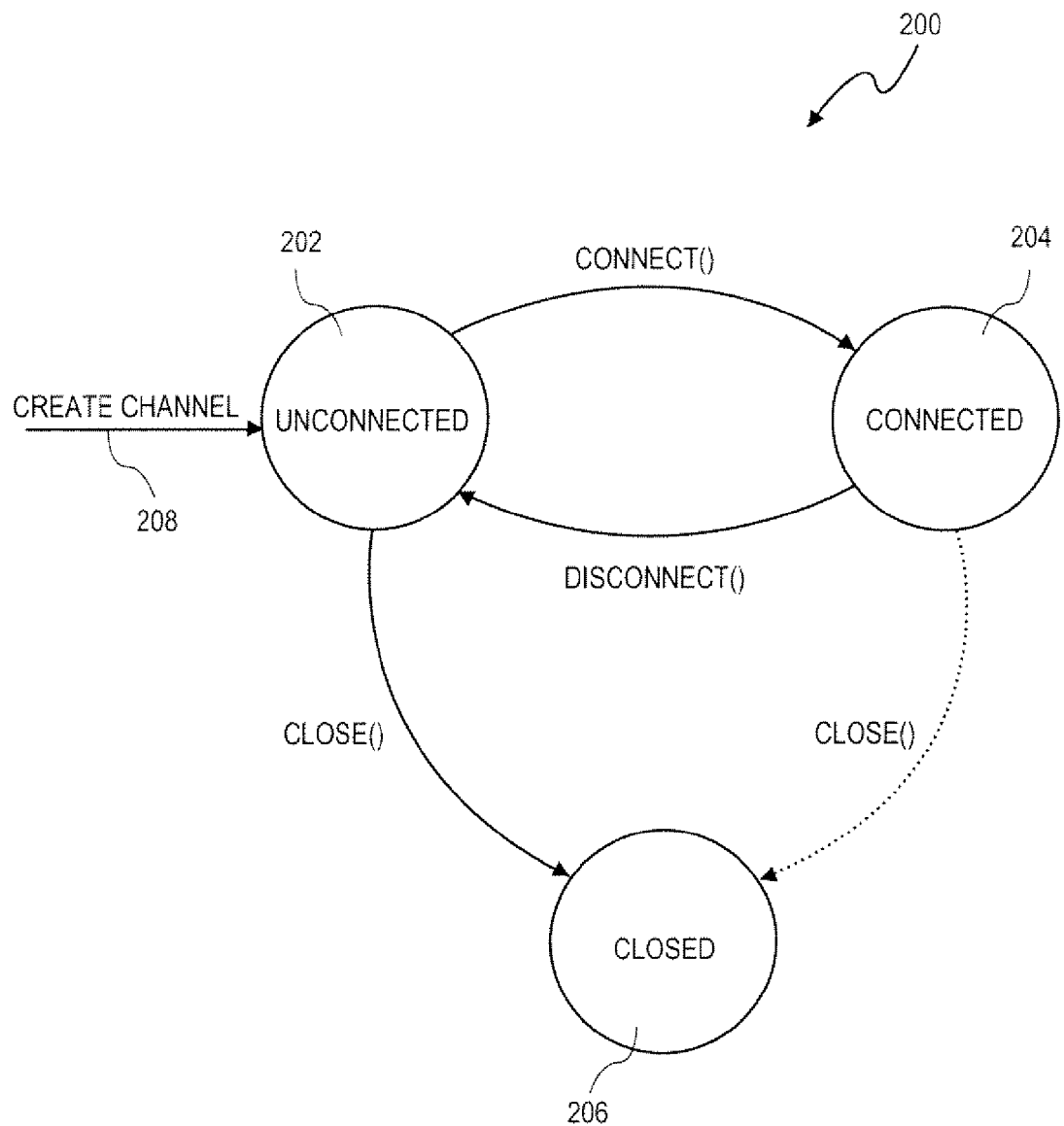
FIG. 2 illustrates a block diagram of one embodiment of a cluster of nodes.

A state transition diagram 200 for the major states a channel can assume are shown in FIG. 2. In order to join a group and send messages, a process has to create a channel. A channel is like a socket. When a client connects to a channel, it gives the name of the group it would like to join. Thus, a channel is (in its connected state) always associated with a particular group. The protocol stack takes care that channels with the same group name find each other: whenever a client connects to a channel given group name G, then it tries to find existing channels with the same name, and joins them, resulting in a new view being installed (which contains the new member). If no members exist, a new group will be created.

When a channel is first created at 208, it is in the unconnected state 202. An attempt to perform certain operations which are only valid in the connected state (e.g. send/receive messages) will result in an exception. After a successful connection by a client, it moves to the connected state 204. Now channels will receive messages, views and suspicions from other members and may send messages to other members or to the group. Getting the local address of a channel is guaranteed to be a valid operation in this state (see below). When the channel is disconnected, it moves back to the unconnected state 202. Both a connected and unconnected channel may be closed 206, which makes the channel unusable for further operations. Any attempt to do so will result in an exception. When a channel is closed directly from a connected state, it will first be disconnected, and then closed.

Creating a Channel

A channel can be created in two ways: an instance of a subclass of Channel is created directly using its public constructor (e.g. new JChannel( )), or a channel factory is created, which—upon request—creates instances of channels. The following discussion focuses on the first method of creating channel: by direct instantiation. Note that instantiation may differ between the various channel implementations.

The public constructor of JChannel looks as follows:
public JChannel(Object properties) throws ChannelException { }

It creates an instance of JChannel. The properties argument defines the composition of the protocol stack (number and type of layers, parameters for each layer, and their order). For JChannel, this has to be a String. An example of a channel creation is:

```
String
props="UDP(mcast_addr=228.1.2.3;mcast_port=45566;ip_ttl=32):" +
    "PING(timeout=3000;num_initial_members=6):" +
    "FD(timeout=5000):" +
    "VERIFY_SUSPECT(timeout=1500):" +
    "pbcast.STABLE(desired_avg_gossip=10000):" +
    "pbcast.NAKACK(gc_lag=10;retransmit_timeout=3000):" +
    "UNICAST(timeout=5000;min_wait_time=2000):" +
    "FRAG:" +
    "pbcast.GMS(initial_mbrs_timeout=4000;join_timeout=5000;" +
    "join_retry_timeout=2000;shun=false;print_local_addr=false)";
JChannel channel;
try {
channel=new JChannel(props);
}
catch(Exception ex) {
// channel creation failed
}
```

The argument is a colon-delimited string of protocols, specified from bottom to top (left to right). The example properties argument will be used to create a protocol stack that uses IP Multicast (UDP) as bottom protocol, the PING protocol to locate the initial members, FD for failure detection, VERIFY_SUSPECT for double-checking of suspected members, STABLE for garbage collection of messages received by all members, NAKACK for lossless delivery of multicast messages, UNICAST for lossless delivery of unicast messages and GMS for group membership (handling of join or leave requests).

If the properties argument is null, the default properties will be used. An exception will be thrown if the channel cannot be created. Possible causes include protocols that were specified in the property argument, but were not found, or wrong parameters to protocols.

Connecting to a Channel

When a client wants to join a group, it connects to a channel giving the name of the group to be joined:

public void connect(String groupname) throws Channel-
    Closed;

The group address is a string, naming the group to be joined. All channels that are connected to the same group (same name) form a group. Messages multicast on any channel in the group will be received by all members (including the one who sent it).

The method returns as soon as the group has been joined successfully. If the channel is in the closed state (see 206 in FIG. 2), an exception will be thrown. If there are no other members, i.e. no other client has connected to a group with this name, then a new group is created and the member joined. The first member of a group becomes its coordinator. A coordinator is in charge of multicasting new views whenever the membership changes.

IP Address

Figure 3:
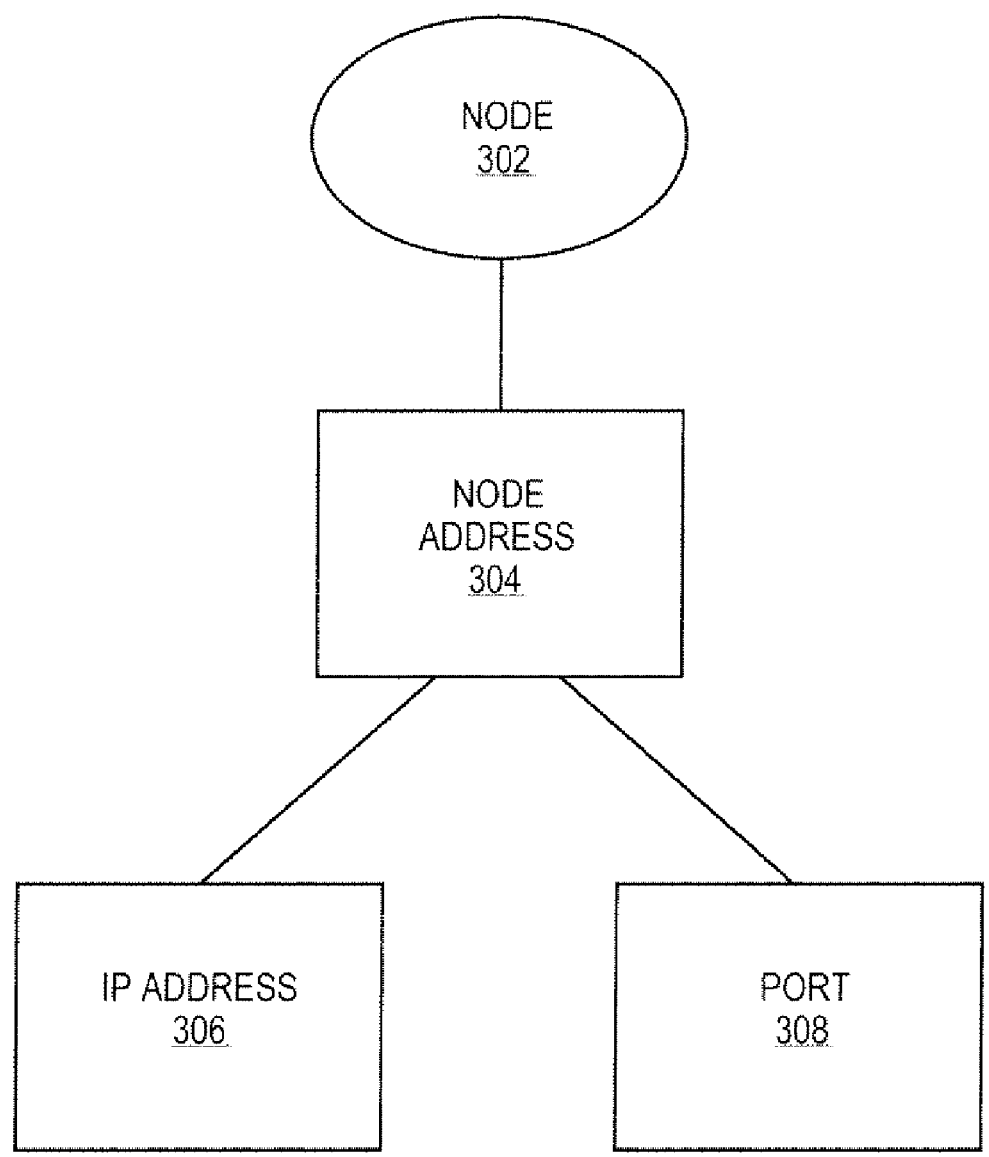
FIG. 3 illustrates a block diagram of a physical node address.

FIG. 3 illustrates a block diagram of a physical node address. Conventionally, the address 304 chosen by each node 302 is essentially the Internet Protocol (IP) address 306 and a port 308 of the receiver socket. However, for the following reasons, this is not good enough:

In the case where the node is shunned (excluded) and re-joins after leaving, the same logical address would be desirable although the physical address has changed.

In the case where a NIC goes down, we want to continue sending/receiving on a different NIC.

In the case where the sender sends on all available NICs (send_on_all_interfaces="true"), this means that, if we take the receiver's datagram packet's address to be the identity of the sender, we get N different identities; 1 for each interface the message is sent on.

In the case where a Network Address Translation is used, the sender's address might get changed by the NAT.

Logical Address

Figure 4:
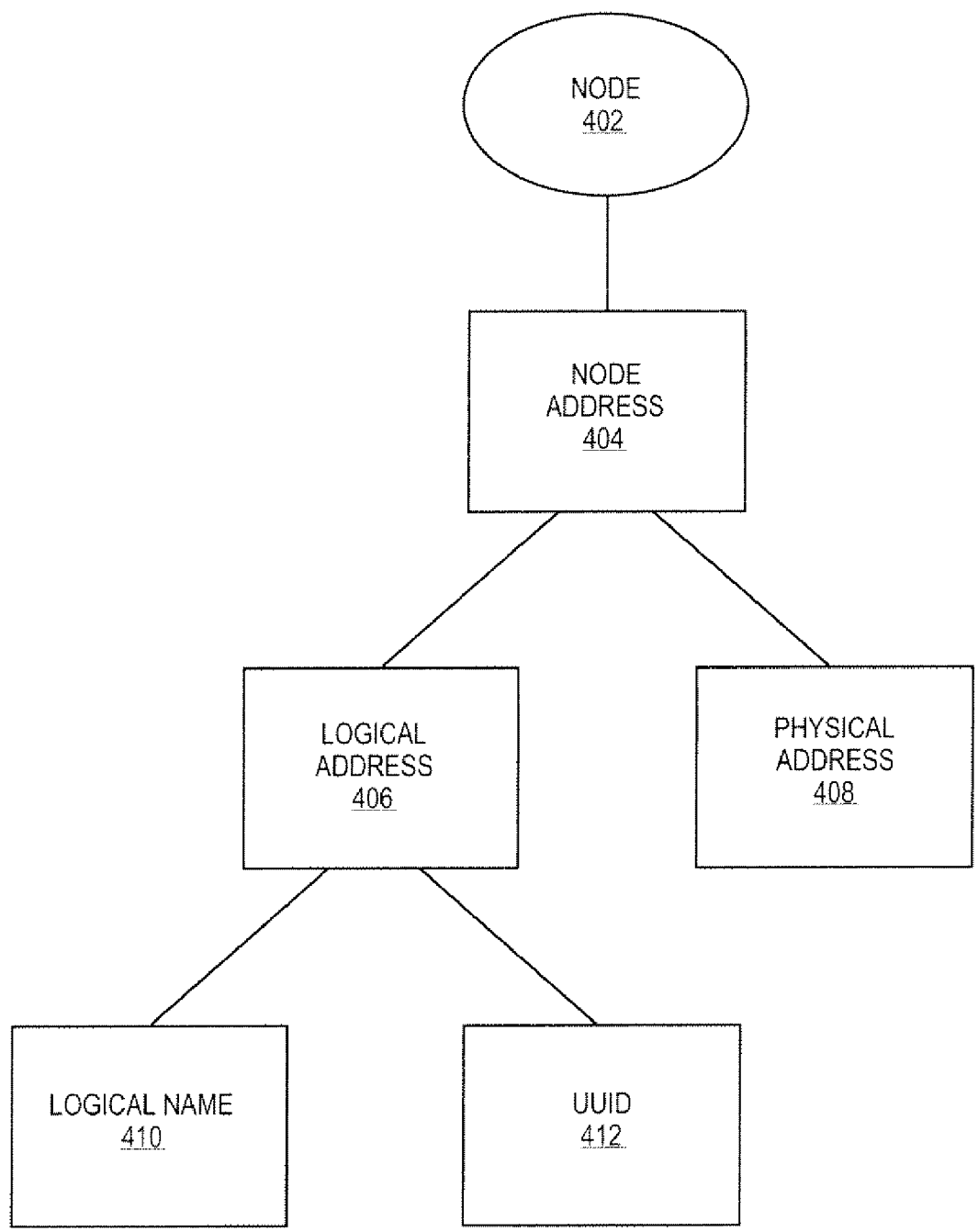
FIG. 4 illustrates a block diagram of one embodiment of a logical node address.

FIG. 4 illustrates a block diagram of one embodiment of a logical node address. A node 402 has an address 404 that includes a logical address 406 associated with a physical address 408. Logical address may be selected by JGroups on channel creation. The lifetime of this address is the lifetime of the process in which the channel is created, or until channel. close( ) or disconnect( ) is called.

Each member may have a small cache, in which it associates the logical addresses for messages received with the sender's address. When a message is to be sent to a logical address (unicast message), the corresponding physical address is looked up from the cache. In accordance with another embodiment, there may be multiple physical addresses if the same message was sent on different interfaces (send_on_all_interfaces="true").

The logical addresses is picked such that they cannot be reused after disconnect( )/close( ).

Design of a Logical Address

In one embodiment, logical address 406 consists of a unique identifier (UUID) 412 and a logical name 410. Logical name 410 is passed to JGroups when a channel is created (new JChannel(String logical_name, String props)). If logical_name is null, JGroups picks a logical name (which is not guaranteed to be unique though). The logical name stays with the channel until the latter is destroyed.

UUID 412 is represented by org.jgroups.util.UUID, which is a subclass of Address and consists of the least and most significant bits variables copied from java.util.UUID. All other instance variables are omitted.

All UUIDs have a reference to a static table which contains the mappings between logical names and UUIDs. Logical name 410 is used in UUID.toString( ), and the least and most significant bits are used for equals( ) and hashCode( ).

A UUID is created on channel connect, deleted on channel disconnect and re-created on channel connect. Since it is re-created on every connect( ), it will prevent reincarnation issues.

Transport (TP)

TP maintains a cache of mappings between UUIDs and physical addresses. Whenever a message is sent, the physical address of the receiver is looked up from the cache.

A UUID can have more than one physical address. A pluggable strategy includes picking a physical address given a UUID. For example, a plugin could load balance between physical addresses.

To exchange cache information, a simple (TP-internal) protocol similar to ARP can be used. Whenever the cache is changed, a 'dirty' flag is set. The next down message(s) will then attach the cache contents to the message in an additional I-HAVE header. Receiving nodes will update their local caches upon reception.

When a physical address for a given UUID is not present, a sender discards (or queues, TBD) the message and broadcasts a WHO-HAS message. Receivers then broadcast (or unicast) the UUID-physical address mapping.

The discovery phase needs to return logical and physical addresses: on reception of a discovery request, the logical address (UUID) and the physical address(es) associated with it, plus the logical name are returned. On reception of a discovery response, the transport places the physical addresses returned into its cache (if not yet present).

UDP Startup

In the case of a UDP startup, the joiner multicasts a discovery request with its UUID, logical name and physical address(es). The receivers' transports add this information into their caches. Each receiver unicasts a discovery response, containing the coordinator's address, plus its own UUID, logical name and physical address(es). On reception of a discovery response, the transport adds this Information to its cache if not yet there.

TCPPING:TCP Startup

The joiner sends a discovery request to all physical addresses listed in initial_hosts. The dest_addr field of a discovery request message is the physical address. The transport usually expects UUIDs as addresses and finds the right physical address in the cache. However, in this case, the transport re-uses the physical address (dest_addr) in the message, bypasses the translation UUID to physical address, and nulls dest_addr in Message. The destination address is now null. This works because Discovery/PING/TCPPING do not check the messages's dest_addr field (otherwise 'null' would be interpreted multicast destination).

On the receiver side, the destination is not used for discovery. The response is sent back to the sender (Message, getSrc( )), this is a UUID and is translated back into a physical address.

TCPGOSSIP:TCP Startup

The joiner asks an external lookup service process (for example, a GossipRouter) for a list of nodes for a given cluster name. The information returned contains a list of nodes, for each node: the logical address (UUID), the logical name, the physical address(es) associated with the UUID.

The joiner's transport adds this information to its cache, then each node of the initial membership is sent a discovery request. The rest is the same as for UDP.

TCPGOSSIP:TUNNEL Startup

Same as for TCPGOSSIP:TCP, but here there is no need for the physical addresses, because every request is sent to the GossipRouter anyway (via our TCP connection to it). The physical address is simply be ignored.

Runtime Scenarios

In one embodiment, at Startup, the transport stores the logical name (generated if user did not pass one to the JChannel( ) constructor).

On connect: the UUID is generated (local address) and associated with the logical name (in UUID.cache). The local socket is created and associated with the UUID in the transport's cache.

On disconnect: the local_addr (UUID) is nulled and removed from the transport's cache and UUID.cache.

At Discovery, Discovery fetches the local_addr (UUID), logical name and physical address(es) from the transport via a GET-LOCAL-ADDR-INFO. A discovery request containing this info is sent out (multicast, unicast via TCP or sent to GossipRouter). The receivers (Discovery protocols) fetch this info from the message and send it down to the transport, which adds it to its cache and to UUID.cache. The receivers then fetch their own local information from the transport and send it along with the discovery response.

On reception of the discovery response, the requester extracts this into from the message and sends it down to its transport, which adds it to its own local cache.

Sending of a Message with No Physical Address Available for UUID

The transport queues the message and sends a WHO-HAS *event* up the stack. The Discovery protocol sends out a WHO-HAS *message* (via multicast, TCP unicast, or to the GossipRouter). The receivers fetch their local information from the transport (exception: the GossipRouter has this information in its local loookup cache), and return it with a I-HAVE message.

On reception of the I-HAVE message, an I-HAVE event is sent down the stack to the transport. The transport updates its local cache from the information and sends all queued messages if the UUID is now available.

Figure 5:
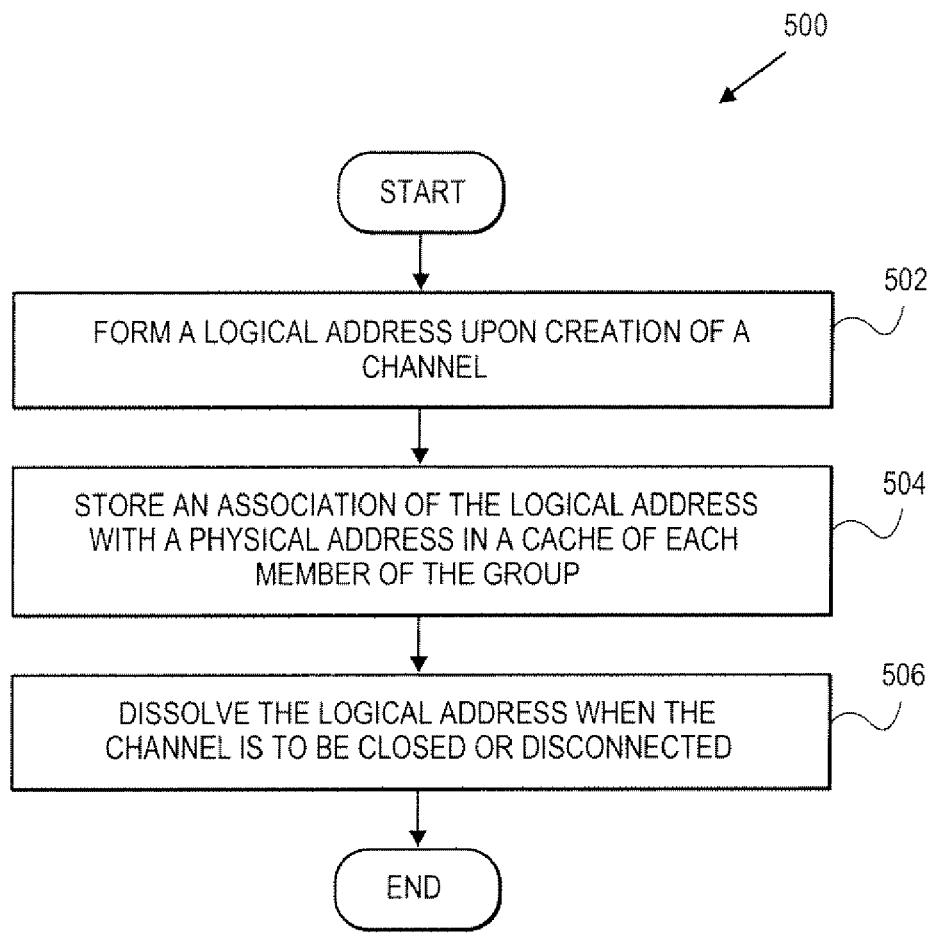
FIG. 5 illustrates a flow diagram of one embodiment of a method for configuring logical addresses for a group communication protocol.

FIG. 5 illustrates a flow diagram of one embodiment of a method for configuring logical addresses for a group communication protocol. The logical address scheme may be written in Java to provide reliable multicast communication. At 502, a logical address is formed upon a creation of a channel of a group communication protocol.

In one embodiment, the logical address includes a unique identifier (UUID) and a logical name. The UUID is created upon connecting the channel, and deleted upon disconnecting the channel.

At 504, a mapping between UUIDs and physical addresses of members of the group is stored in a cache of a member of the group. At 506, the logical address is dissolved when the channel is to be closed or disconnected.

The logical address is formed independently of an IP address and a port of a receiver socket. The logical address may be selected by a user on channel creation. Each channel may be associated with a corresponding group. The logical address is selected such that it cannot be reused after a corresponding channel is closed or disconnected.

Figure 6:
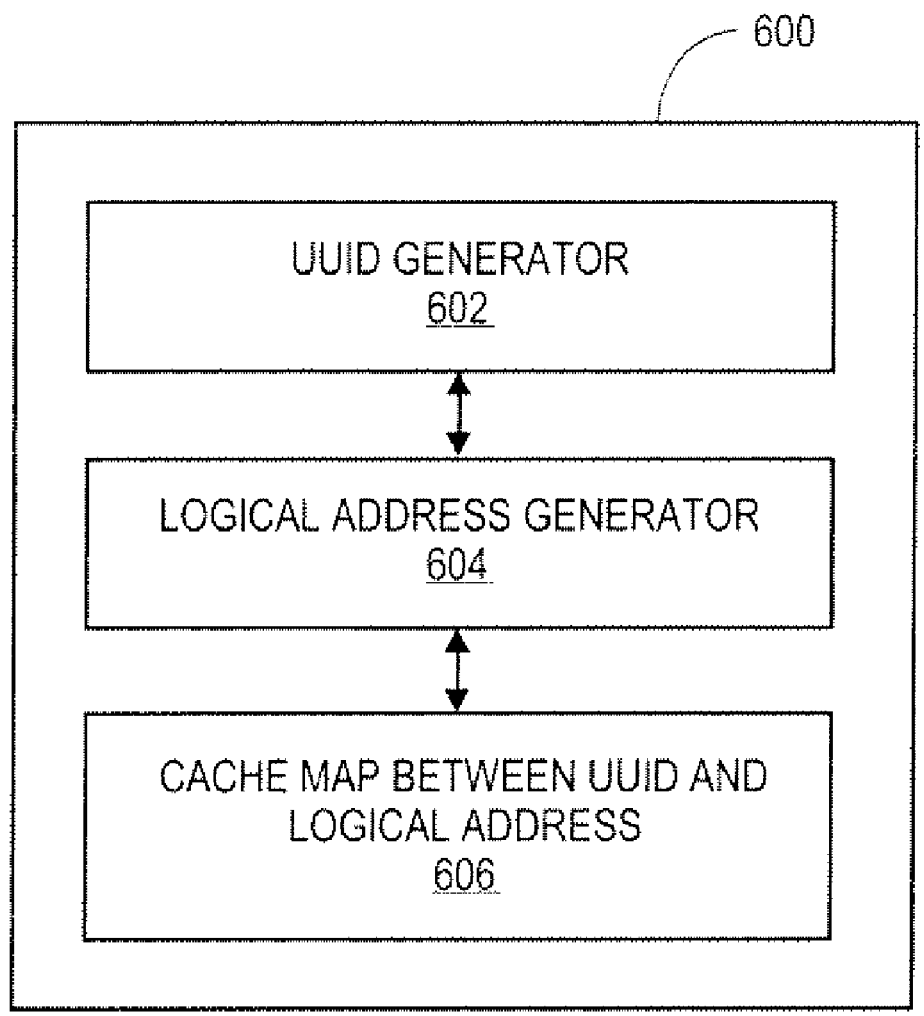
FIG. 6 illustrates a block diagram of one embodiment of a device for generating node logical address.

FIG. 6 illustrates a block diagram of one embodiment of a device 600 for generating node logical address. Device 600 includes a UUID generator 602, a logical address generator 604, and a cache 606 storing a mapping between UUIDs and logical addresses.

UUID generator 602 is configured to generate UUIDs upon connection. UUIDs are destroyed upon disconnect of the nodes. Logical address generator is configured to generate a logical address associated with the generated UUID. Device 600 may be implemented in one embodiment in a computer system as illustrated in FIG. 7.

Figure 7:
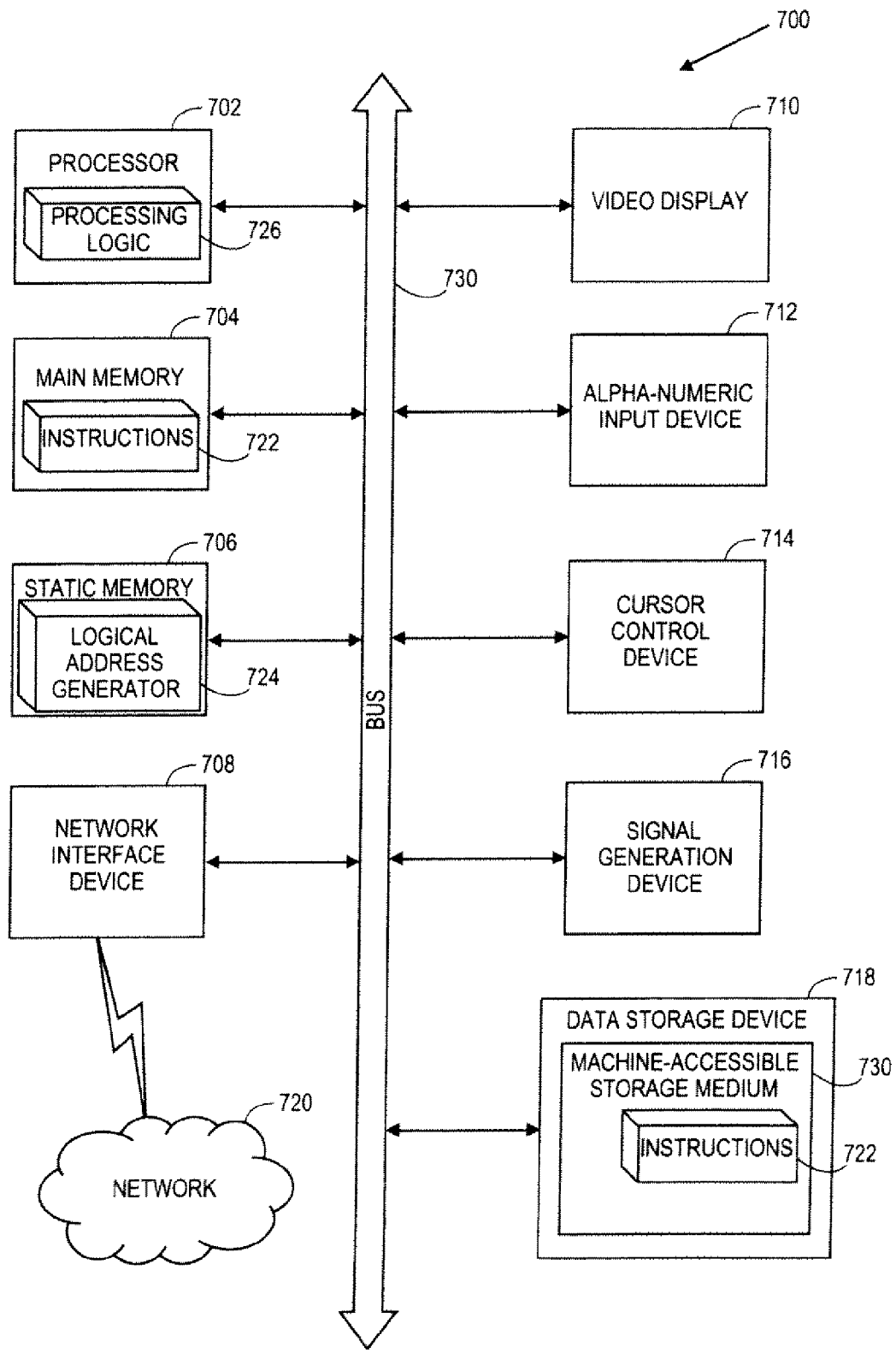
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processing device implementing other instruction sets, or processing devices implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute modules 726 (previously described with respect to FIG. 1) for performing the operations and steps discussed herein with. In one embodiment, the modules may be include hardware or software or a combination of both. In another embodiment, processing device 702 includes a pure function identifier module 728.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-accessible storage medium 730 on which is stored one or more sets of instructions embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting computer-accessible storage media. The software 722 may further be transmitted or received over a network 720 via the network interface device 708.

The computer-accessible storage medium 730 may also be used to store the logical address generator/UUID generator/cache map 724 as presently described. The logical address generator/UUID generator/cache map 724 may also be stored in other sections of computer system 700, such as static memory 706.

While the computer-accessible storage medium 730 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "forming" or "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for processing messages, the method comprising:

forming a logical address upon a creation of a channel of a group communication protocol at a logical address generator of a server, the logical address comprising a unique identifier (UUID) associated with a logical name, the UUID created upon connecting the channel, and deleted upon disconnecting the channel, the logical name unique to the UUID and the logical address; and storing a mapping between UUIDs and physical addresses of members of the group in a cache of a member of the group;

wherein the logical address is selected such that it cannot be reused after a corresponding channel is closed or disconnected.

2. The computer-implemented method of claim 1 wherein the logical address is formed independently of an IP address and a port of a receiver socket.

3. The computer-implemented method of claim 2 wherein the logical address is selected by a user on channel creation.

4. The computer-implemented method of claim 1 wherein each channel is associated with a corresponding group.

5. The computer-implemented method of claim 1 further comprising:

sending messages to the logical address through a programming interface layered on ton of a building block, the building block layered on top of a corresponding channel of a channel layer, the channel layer layered on top of a protocol stack, and the protocol stack coupled to a network.

6. The computer-implemented method of claim 1 further comprising:
   receiving messages from the logical address through a programming interface layered on top of a building block, the building block layered on top of a corresponding channel of a channel layer, the channel layer layered on top of a protocol stack, and the protocol stack coupled to a network.

7. A non-transitory computer-readable storage medium, having instructions stored therein, which when executed, program a computer system to perform a method comprising:
   forming a logical address upon a creation of a channel of a group communication protocol, the logical address comprising a unique identifier (UUID) associated with a logical name, the UUID created upon connecting the channel, and deleted upon disconnecting the channel, the logical name unique to the UUID and the logical address; and
   storing a mapping between UUIDs and physical addresses of members of the group in a cache of a member of the group;
   wherein the logical address is selected such that it cannot be reused after a corresponding channel is closed or disconnected.

8. The non-transitory computer-readable storage medium of claim 7 wherein the logical address is formed independently of an IP address and a port of a receiver socket.

9. The non-transitory computer-readable storage medium of claim 8 wherein the logical address is selected by a user on channel creation.

10. The non-transitory computer-readable storage medium of claim 7 wherein each channel is associated with a corresponding group.

11. The non-transitory computer-readable storage of claim 7 wherein the method further comprises:
   sending messages to the logical address through a programming interface layered on top of a building block, the building block layered on top of a corresponding channel of a channel layer, the channel layer layered on top of a protocol stack, and the protocol stack coupled to a network.

12. The non-transitory computer-readable storage medium of claim 7 further comprising:
   receiving messages from the logical address through a programming interface layered on top of a building block, the building block layered on top of a corresponding channel of a channel layer, the channel layer layered on top of a protocol stack, and the protocol stack coupled to a network.

13. An apparatus for processing messages comprising:
   a unique identifier (UUID) generator configured to generate a UUID assigned to a node of a group communication protocol, the UUID for the node generation upon the node connecting to a channel of the group communication protocol, and deleted upon the node disconnecting from the channel;
   a logical address generator communicably coupled to the UUID generator, the logical address generator configured to form a logical address associated with the generated UUID for the node, the logical address comprising the UUID of the node and a logical name unique to the UUID and the logical address, wherein the logical address is selected such that it cannot be reused after a corresponding channel is closed or disconnected; and
   a cache communicably coupled to the UUID generator and the logical address generator, the cache configured to store a mapping between UUIDs and physical addresses of nodes of the group in a cache of a node of the group.

14. The apparatus of claim 13 wherein the logical address is formed independently of an IP address and a port of a receiver socket.

15. The apparatus of claim 14 wherein the logical address is selected by a user on channel creation.

16. The apparatus of claim 13 wherein each channel is associated with a corresponding group.

17. The apparatus of claim 13 wherein the transport protocol stack is coupled to a network for sending and receiving messages to members of the group.

* * * * *